United States Patent [19]

Minardi et al.

[11] Patent Number: 4,689,950
[45] Date of Patent: Sep. 1, 1987

[54] HOT GAS FLOW GENERATOR WITH NO MOVING PARTS

[75] Inventors: John E. Minardi; Hans P. von Ohain, both of Dayton, Ohio

[73] Assignee: University of Dayton, Dayton, Ohio

[21] Appl. No.: 745,166

[22] Filed: Jun. 17, 1985

[51] Int. Cl.[4] ............................................. F02K 7/00
[52] U.S. Cl. ........................................ 60/204; 60/269
[58] Field of Search ................. 60/204, 269, 39.52, 60/726, 200.1, 266

[56] References Cited

U.S. PATENT DOCUMENTS

| | | | |
|---|---|---|---|
| 2,935,840 | 5/1960 | Schoppe | 60/35.6 |
| 3,323,304 | 6/1967 | Llobet et al. | 60/269 |
| 3,621,654 | 11/1971 | Hull | 60/39.51 |
| 3,680,317 | 8/1972 | Kotoc | 60/269 |

FOREIGN PATENT DOCUMENTS 130959 2/1951 Sweden.

Primary Examiner—Louis J. Casaregola
Attorney, Agent, or Firm—Biebel, French & Nauman

[57] ABSTRACT

A method is disclosed of transferring energy into a flow of air without use of rotating parts, in which an inlet flow of air is made to swirl into a first circular path moving longitudinally of a housing, heat is added to the inlet flow of air at the end of the first path to produce hot gases, and the hot gases are directed into a second swirling circular path coaxially of and within the first path and having an open interface therewith, whereby energy is transferred from the hot gases in the second path into the inlet flow of air in the first path. An embodiment of the method is disclosed in the form of a fluid mass reaction engine having an annular housing including an inlet thereinto and an outlet therefrom, a combustion chamber in the housing spaced from the inlet, spaced coaxial openings into and out of the combustion chamber, and a means for heating air flowing through said combustion chamber. A first swirling device acts on air entering the inlet to produce a circular flow of air moving into the combustion chamber and having a substantial component of centrifugal velocity, a second swirling means acts on hot gases flowing out of the combustion chamber to produce a swirling flow of hot gases within the incoming circular flow of air moving toward said housing inlet and having also a substantial component of centrifugal velocity. A means for directing the hot gases leaving the interface to the housing outlet, and a means upstream of the housing outlet for changing the swirling flow of hot gases into an essentially linear gas flow, provide a motive reaction jet passing through the housing outlet.

6 Claims, 11 Drawing Figures

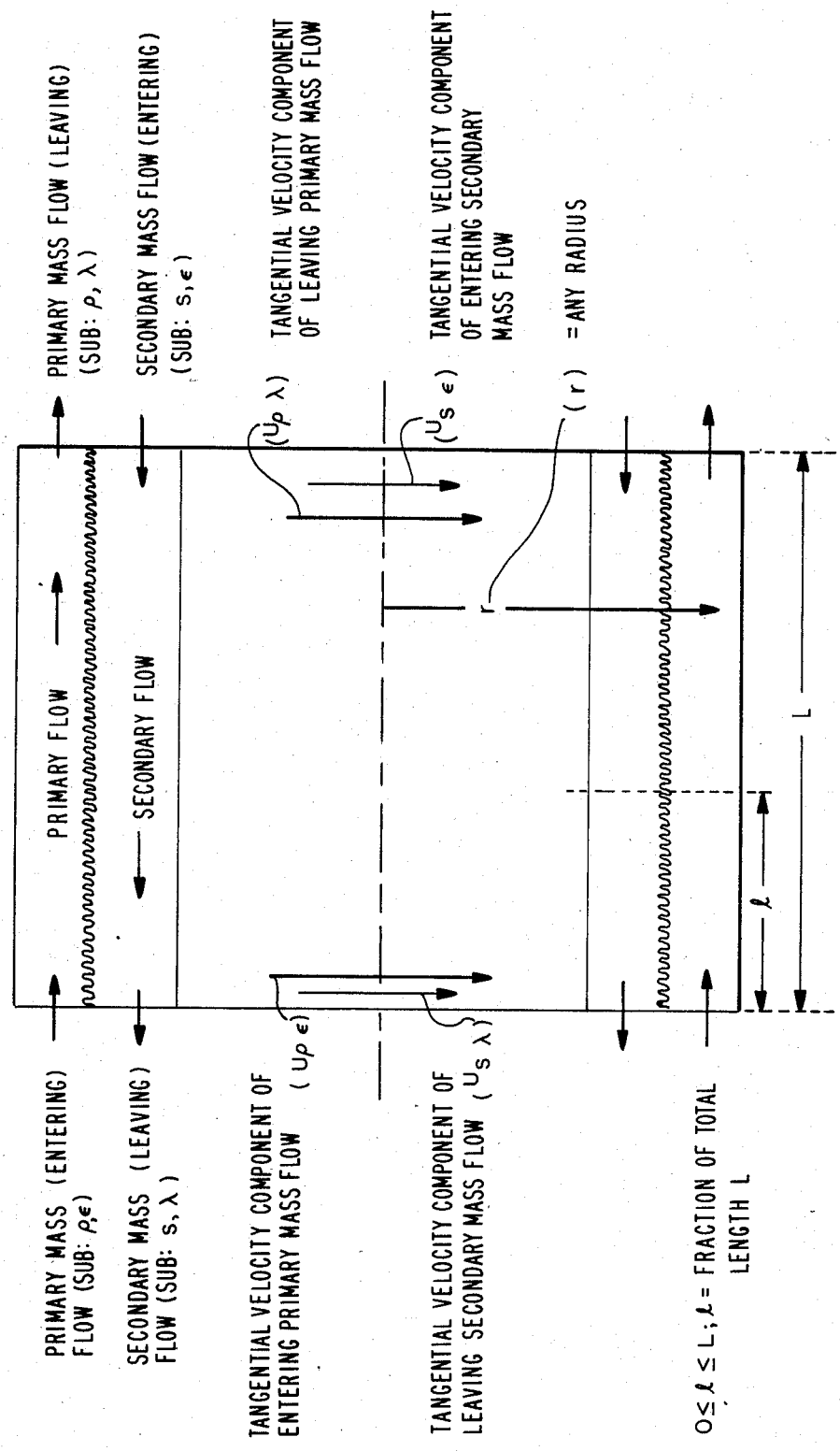

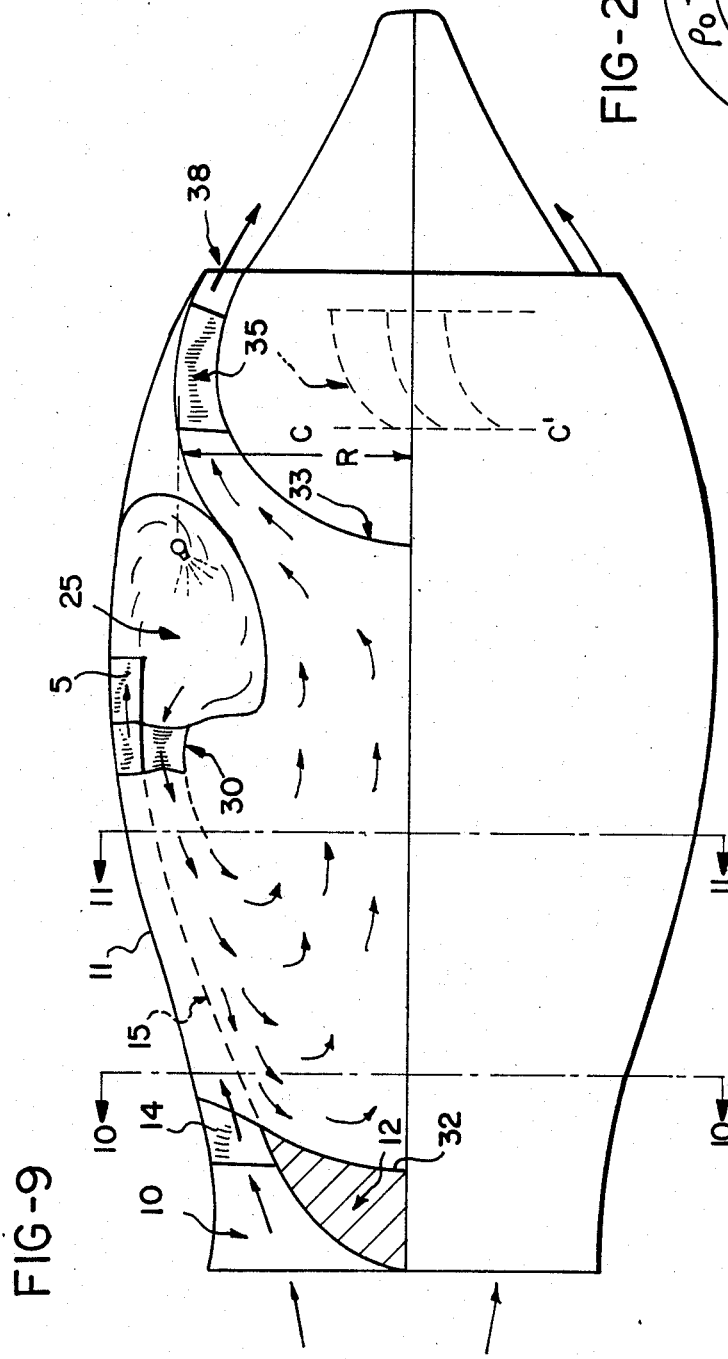
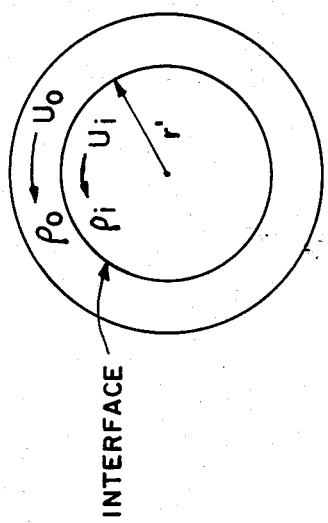

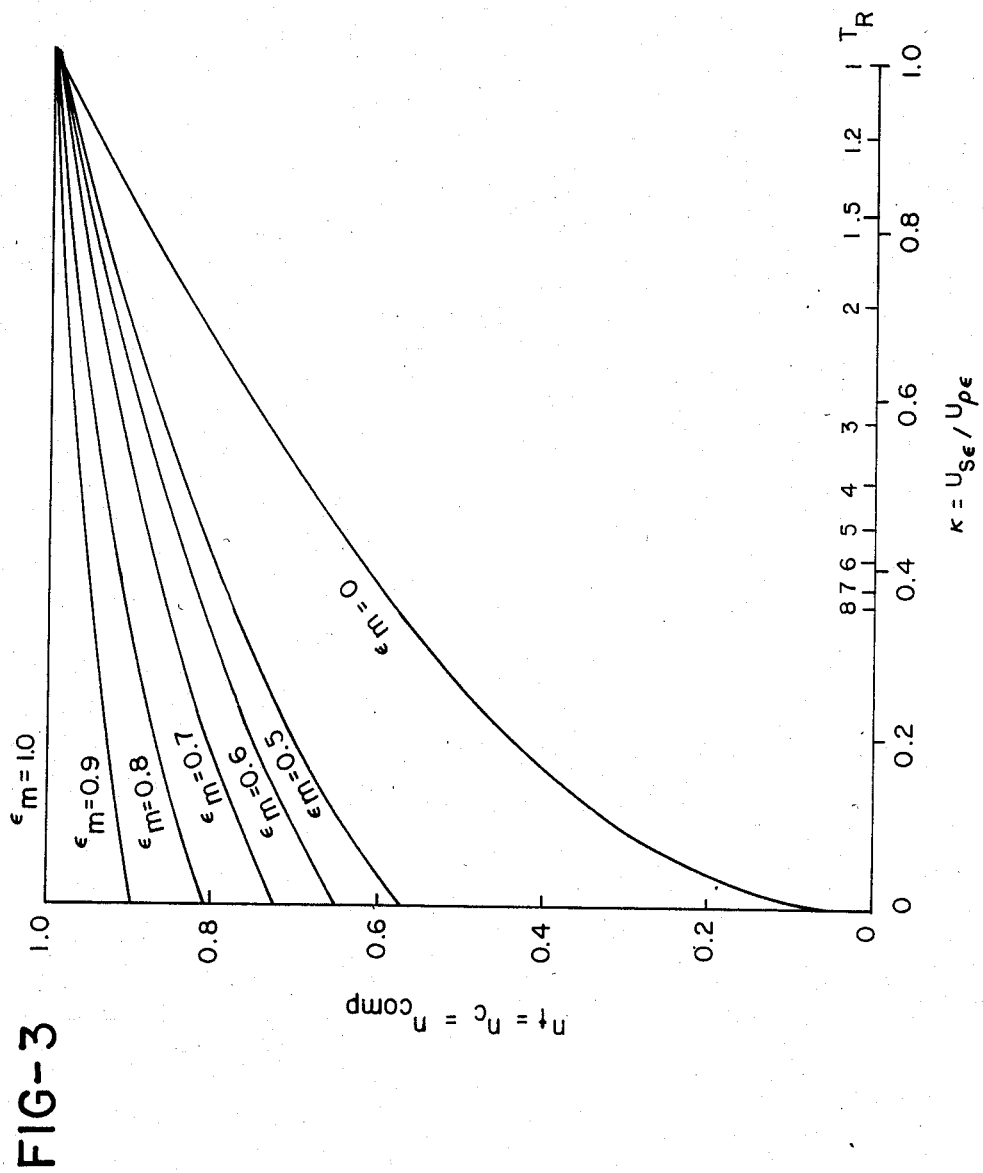

HOT GAS FLOW GENERATOR WITH NO MOVING PARTS

BACKGROUND OF THE INVENTION

Energy exchange processes between two working media of different total pressure and temperature play a key role in the field of aeropropulsion. Generally, rotating fluid flow machines such as turbines, compressors, and fans are employed to perform the energy exchange processes in aeropropulsion systems. However, a great deal of effort has been spent to enable the use of energy exchange processes not employing rotating machinery. These are processes in which the two working media are brought in direct contact with each other, e.g., direct energy exchange processes. Typical representatives are ejectors of the steady flow or crypto-steady type, pressure exchange processes, pulse or ram jets, and others. The significance of the direct energy exchange processes lies in a substantial number of advantages over rotating machinery, namely, structural simplicity, low weight, low cost, high reliability because of the absence of high speed machine elements, use of ultra-high temperature materials including nonmetallic materials (due to the absence of centrifugal stresses), and use of nonstrategic materials and materials resulting in smaller radar cross-sections.

Direct momentum (or energy) exchange processes offer the possibility of achieving very compact lightweight engine structures. The important operational and performance characteristics of such devices are to a large measure a direct consequence of the absence of rotating machinery. Extreme short response time of power output to changes in fuel input is available due to the absence of the moment of inertia of a turbomachinery rotor. The operational boundaries of the engine are not determined by temperature-stress limitations of rotating components as is the case in gas turbine engines, but by internal Mach numbers and temperature limitations of non-moving combustor components. Therefore, the corrected speed of the engine can be kept constant over a much wider range of flight Mach numbers and altitudes than is possible for a gas turbine engine. Also, excellent storability is possible due to the absence of bearing and lubrication systems, which is very important for missile engines.

Current direct energy exchange processes can be grouped into two major categories, (a) those which use unsteady flow processes such as shock tubes, pulse jets, pressure exchangers, and unsteady or crypto-steady ejectors; and (b) steady flow processes such as continuous flow ejectors used as pumps, thrust augmentors, and other applications. The unsteady flow direct momentum exchange processes, when used as a primary propulsion system, have a relatively low overall efficiency and a low power density in comparison to turbomachinery systems, and in some cases have very severe noise and vibration problems which can be more destructive than the high stresses in rotating machines.

The current steady flow ejector systems, while simple and elegant in structure, cannot be used as primary components in propulsion systems. Their potential applicability is limited to augmentors of mass flow and thrust of conventional or existent primary propulsion systems. Several independent studies have shown that ejector-thrust augmentation ratios are highest at still-standing and decrease to zero around a flight Mach number of 1. From this point on the thrust augmentation ratios, through thermodynamic effects, increase slightly above one with increasing supersonic flight speed. Potentially attractive and promising application areas of ejector processes lie in the field of aircraft-engine integration relevant to VSTOL, STOL, and vehicle boundary layer acceleration.

Steady flow ejector processes, as known today, are based on momentum exchange between two mass streams flowing in the same direction through a mixing duct. Hereafter such processes will be referred to as "coflowing momentum exchange processes." At the beginning of mixing, the two interacting gaseous media have differences in one or more of the following fluid flow parameters: velocity, total and/or static pressure, total and/or static temperature, and physical or chemical characteristics (chemical reactions during mixing not being considered). The medium having, at the onset of mixing, the greater total pressure is called the "primary medium" and the medium having the lower total pressure is called the "secondary medium."

Two fundamental characteristics of current steady coflowing ejector processes prevent this type of momentum exchange process from being applicable as the primary component process in an aeropropulsion system.

First, there are high intrinsic mixing losses in a steady coflowing ejector. The differences between the flow parameters (speed, pressure, temperature) of primary and secondary flow are largest at the beginning of mixing and equilibrate through the process of mixing to equal temperature, speed, and pressure. Thereby, the entropy of the mixture is increased over the sum of the entropies of the primary and secondary media prior to mixing. The greater the initial differences are between the flow parameters of primary and secondary working media, the greater is this total entropy increase. For example, consider a gas turbine engine. The differences in flight stagnation pressure and temperature (secondary conditions) and combustor exit stagnation pressure and temperature (primary conditions) are so large that the mixing losses in a coflowing ejector would greatly exceed the losses in corresponding turbomachinery. This would be true even for an ideal ejector without skin friction and diffuser losses, and with supersonic flow after mixing.

Second, there is a inherent limitation of the amount of energy that can be transferred from the primary to the secondary working medium in a steady coflowing ejector. In a steady coflowing process the primary and secondary working media are brought by mixing to a uniform speed, $V_m$, total pressure, $P_{om}$, and total temperature, $T_{om}$. Since $P_{om}$ and $T_{om}$ are different from the stagnation conditions $P_{os}$ and $T_{os}$ of the secondary working medium prior to mixing ($P_{os}$ and $T_{os}$ correspond to the level of zero availability), it follows that availability is left after mixing. This in turn means that in the coflowing ejector only a fraction of the available energy of the primary working medium can be transferred to the secondary working medium.

Considerations of Interface Stability

Assuming that it is possible to have self-sustained operation of a momentum exchanger, it is important to understand the interface stability between two swirling flows. Reference is made to the text entitled Boundary-Layer Theory by Dr. Hermann Schlichting, sixth Ed. (translated), published by McGraw-Hill Book Company, New York NY (1968), particularly pages 500–503 referring to the work of G. I. Taylor, and to the text Jets, Wakes, and Cavities by G. Birkhoff and E. H. Zarantonello, published by Academic Press Inc., New York NY (1957), particularly pages 251–255 and the discussion of Taylor instability as observed by Sir Geoffrey Taylor.

FIG. 2 of the drawings shows the interface between two concentric rotating cylindrical flows: the inner flow (subscript i hereafter) has density $\rho_i$ and velocity $U_i$ and the outer flow (subscript o hereafter) has density $\rho_o$ and velocity $U_o$. As shown on FIG. 2, there are four significant conditions which are termed stable, semi-stable, semi-unstable, and unstable. Each of these is explained below.

Case 1: $\rho_i < \rho_o$ and $\rho_i U_{t,i}^2(r') < \rho_o U_{t,o}^2(r')$

Under these conditions the interface is initially stable and remains stable after the velocities equilibrate. A distinction can also be made between the following velocity conditions:

- $U_o = U_i$—This is the most stable condition (it corresponds to an inversion layer in meterology).
- $U_o < U_i$—Wave perturbations resulting from the velocity difference at the interface, transfer momentum from the inner to the outer swirl.
- $U_o > U_i$—Wave perturbations at the interface, transfer momentum from the outer to the inner swirl.

Case 2: $\rho_i > \rho_o$ and $\rho_i U_i^2 < \rho_o U_o^2$

Initially the two swirls are Taylor stable at the interface at the radius (r'). However, since $U_o$ must be greater than $U_i$ in order to satisfy the above given initial conditions, momentum is transferred from the low density outer flow to the high density inner flow. As the inner velocity increases eventually a point is reached where the flow is unstable since $\rho_i > \rho_o$.

Due to the fact that initially the two swirls are Taylor stable and later become unstable, this flow is called "semi-stable." The reorganization into the end condition requires a much longer time than those cases where initially the two swirls are Taylor unstable.

Case 3: $\rho_i \rho_o$; $\rho_i U_i^2 > \rho_o U_o^2$

The two swirl flows are initially Taylor unstable, and therefore the interface disrupts immediately, and large eddies of high velocity low density mass enter into the outer swirl of high mass density and lower velocity. Velocity equilibration is quickly reached and the flow density eddies are driven back toward the interface by buoyancy forces. This momentum exchange process is very intense, while irreversible mixing is slight. In this case the flow is initially unstable but becomes stable, therefore this process of momentum exchange is termed "semi-unstable."

Case 4: $\rho_i > \rho_o$ and $\rho_i U_i^2 > \rho_o U_o^2$

The two swirl flows are unstable. The inner swirl having the larger density medium and the larger total pressure disrupts the interface and will only be stable when it moves to the outside, while the outer medium having the lower density and the lower total pressure seeks the inner core and is stable when it moves to the inside.

SUMMARY OF THE INVENTION

The present invention provides a new type of steady flow momentum exchange process which departs from the coflowing type, and which will be called a counterflow momentum exchange process. It is necessary first to discuss the conditions for counterflow momentum exchange, and subsequently for coflow momentum exchange, and the fundamental differences between both modes of operation. The terms "coflow momentum exchange" process (for ejectors) and "counterflow momentum exchange" process (for the new approach of this invention) are chosen because of their close analogy to heat exchange processes, which are categorized according to coflow, crossflow, and counterflow types. Of these, the most efficient process is the counterflow type.

In the present invention the primary and secondary flows have a velocity composed of a tangential and an axial flow component (like in axial fluid flow machinery) in a semi-unstable configuration (Case 3 above). The axial flow component is small in comparison to the tangential flow component. Like in turbomachinery, the mass transport is determind by the axial velocity component, the flow cross-section and the mass density, while the angular momentum is determined by the radius and tangential flow component. It is the angular momentum which is exchanged between the primary and secondary flows, while the axial transport velocity remains essentially unchanged from inlet to exit.

In one-dimensional flow only a coflow momentum exchange process is possible. However, in two-dimensional and is axisymmetrical flow configurations other types of momentum exchange processes, the crossflow and counterflow types, are also possible. An axisymmetrical, axial flow configuration is best suited for explaining the basic principle of a counterflow momentum exchange process and is referred to in the detailed description, although it differs from the best configuration for an actual process, which is is also described as a specific embodiment.

BRIEF DESCRIPTION OF THE DRAWINGS

FIG. 1 is a diagram of the conditions in a coaxial counterflowing situation, viewing a theoretical cross-section taken longitudinally of the flowing gases;

FIG. 2 (sheet 8) is a diagram of the flow situation depicted in FIG. 1, as viewed along a plane transverse to the direction of flow;

FIG. 3 is a diagram plotting equivalent component efficiency as a function of the velocity ratio K;

FIG. 9 is a side view, with the top half shown in cross-section, of a typical jet engine having no moving parts.

DESCRIPTION OF A PREFERRED EMBODIMENT

Figure 4:
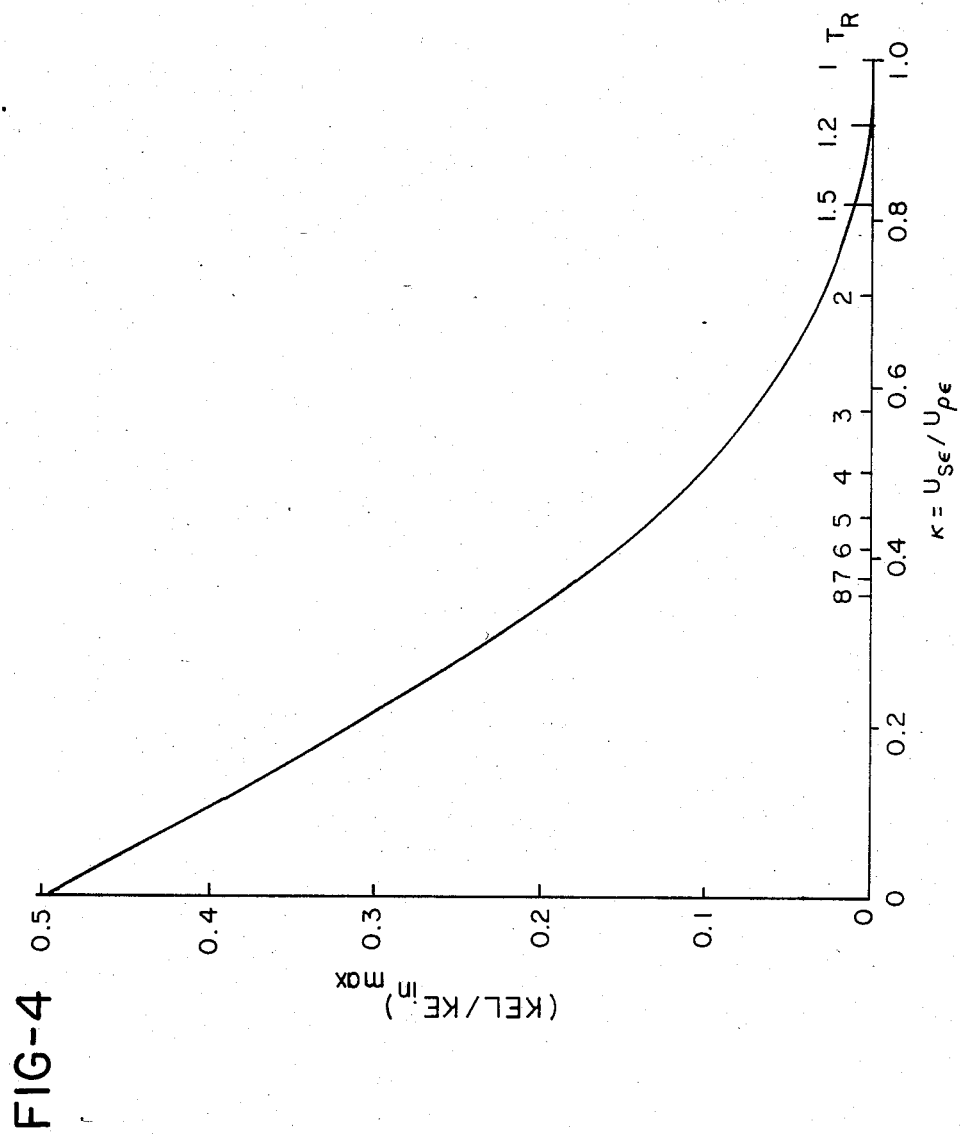
FIG. 4 is a diagram plotting loss in kinetic energy as a function of the velocity ratio.

In this specification the theory of a general momentum exchanger is developed for the case of equal mass flows of the primary and secondary flows, and based on that theory, there is then described a development of a steady flow engine which has no moving parts and which can develop thrust at zero flight speed (stillstanding).

Theoretical Development

The following theoretical development applies to the case of equal mass flows:

$$\dot{m}_p = \dot{m}_s \quad \text{(E-1)}$$

along with the assumption that all values of the characteristic radii will be assumed to be equal:

$$r_{p\epsilon} = r_{p\lambda} \simeq r_{s\epsilon} = r_{s\lambda} \simeq \text{Radius of Interface} \quad \text{(E-2)}$$

Under these conditions it follows from the angular momentum conservation, that (see FIG. 1 diagram for nomenclature)

$$U_{p\epsilon} - U_{p\lambda} = U_{s\lambda} - U_{s\epsilon} \quad \text{(E-3)}$$

at any station (l), where ($0 \leq l \leq L$), two equations relating momentum must be satisfied:

$$U_{p\epsilon} - U_{pl} = U_{s\lambda} - U_{sl} \quad \text{(E-4)}$$

and $$U_{pl} - U_{p\lambda} = U_{sl} - U_{s\epsilon} \quad \text{(E-5)}$$

Subtracting Equation (E-5) from Equation (E-4) results in:

$$U_{p\epsilon} - 2U_{pl} + U_{p\lambda} = U_{s\lambda} - 2U_{sl} + U_{s\epsilon} \quad \text{(E-6)}$$

or $$U_{pl} - U_{sl} \equiv \Delta U = \frac{U_{p\epsilon} + U_{p\lambda}}{2} - \frac{U_{s\lambda} + U_{s\epsilon}}{2} \quad \text{(E-7)}$$

which means the velocity difference between primary and secondary flow at any station (l) is constant and equal to the difference of the arithmetic averages of primary and secondary mass flows. It follows from Equations (E-4) and (E-7) that $$U_{s\lambda} = U_{p\epsilon} - \Delta U \quad \text{(E-8)}$$

For the total temperatures the following relationships can be derived from the conservation of total enthalpy (calorically perfect gas) in view of Equation (E-1):

$$T_{op\epsilon} - T_{opl} = T_{os\lambda} - T_{osl} \quad \text{(E-9)}$$

$$T_{opl} - T_{op\lambda} = T_{osl} - T_{os\epsilon} \quad \text{(E-10)}$$

resulting in $$T_{op\epsilon} - 2T_{opl} + T_{op\lambda} = T_{os\lambda} - 2T_{osl} + T_{os\epsilon} \quad \text{(E-11)}$$

or $$T_{opl} - T_{osl} \equiv \Delta T_o = \frac{T_{op\epsilon} + T_{op\lambda}}{2} - \frac{T_{os\epsilon} + T_{os\lambda}}{2} \quad \text{(E-12)}$$

That is, the total temperature difference between primary and secondary flow is the same at any station (l) and is equal to the difference between the arithmetic averages of the total temperatures of primary and secondary working media. In a counterflow heat exchanger, it is common practice to define an effectiveness parameter $\epsilon_H$, that for a calorically perfect gas and $m_p = m_s$ is $$\epsilon_H \equiv \frac{T_{os\lambda} - T_{os\epsilon}}{T_{op\epsilon} - T_{os\epsilon}} = \frac{T_{op\epsilon} - T_{op\lambda}}{T_{op\epsilon} - T_{os\epsilon}} \quad \text{(E-13)}$$

In analogy for the momentum exchange a momentum effectiveness, $\epsilon_m$, can be defined:

$$\epsilon_m \equiv \frac{U_{s\lambda} - U_{s\epsilon}}{U_{p\epsilon} - U_{s\epsilon}} = \frac{U_{p\epsilon} - U_{p\lambda}}{U_{p\epsilon} - U_{s\epsilon}} \quad \text{(E-14)}$$

In view of Equation (E-8) it follows that:

$$\epsilon_m = 1 - \left[ \frac{\Delta U}{U_{p\epsilon} - U_{s\epsilon}} \right] \quad \text{(E-15)}$$

or defining $\xi_m$:

$$\xi_m \equiv \frac{\Delta U}{U_{p\epsilon} - U_{s\epsilon}} \quad \text{(E-16)}$$

it follows that $$\epsilon_m = 1 - \xi_m \quad \text{(E-17)}$$

Thus, there is a direct linear relationship between the effectiveness, $\epsilon_m$, of the momentum exchange process and the slip velocity ratio, $\xi_m$. The effectiveness has a value of one only if $\xi_m$ has a value of zero. Just as in the case with a heat exchanger, the effectiveness can only approach one if the device becomes very large. For all values of $\epsilon_m$ less than one, there will be a loss in kinetic energy as a result of the momentum exchange. Therefore consideration should be given to the transfer efficiency, $\eta_{tr}$, of the kinetic energy exchange between the primary and secondary flows.

The kinetic energy lost by the primary is related to the kinetic energy gained by the secondary as follows:

$$(U_{p\epsilon}^2 - U_{p\lambda}^2)\eta_{tr} = (U_{s\lambda}^2 - U_{s\epsilon}^2) \quad \text{(E-18)}$$

In view of the momentum equation, Equation (E-3), it follows that $$(U_{p\epsilon} + U_{p\lambda})\eta_{tr} = U_{s\lambda} + U_{s\epsilon} \quad \text{(E-19)}$$

Using the slip velocity results in $$(U_{p\epsilon} + U_{s\epsilon} + \Delta U)\eta_{tr} = U_{p\epsilon} + U_{s\epsilon} - \Delta U \quad \text{(E-20)}$$

It is convenient to define the velocity ratio, $\kappa$:

$$\kappa \equiv \frac{U_{s\epsilon}}{U_{p\epsilon}} \quad \text{(E-21)}$$

Combining Equations (E-21) and E-15) results in $$\frac{\Delta U}{U_{p\epsilon}} = (1 - \epsilon_m)(1 - \kappa) \quad \text{(E-22)}$$

Combining Equations (E-22), (E-21), and (E-20) results in an expression for the transfer efficiency:

$$\eta_{tr} = \frac{2\kappa + \epsilon_m(1-\kappa)}{2 - \epsilon_m(1-\kappa)} \qquad \text{(E-23)}$$

The transfer efficiency of kinetic energy for turbomachinery is the product of the component efficiencies: $\eta_t\eta_c$. Thus, an equivalent component efficiency (assuming $\eta_t=\eta_c$) for the counterflow momentum exchanger is given as the $\sqrt{\eta_{tr}}$:

$$\eta_{comp} = \sqrt{\eta_{tr}} = \sqrt{\frac{2\kappa + \epsilon_m(1-\kappa)}{2 - \epsilon_m(1-\kappa)}} \qquad \text{(E-24)}$$

This relation is plotted in FIG. 3, where it is evident that values of component efficiencies greater than 0.8 are possible if high enough values of $\epsilon_m$ or $\kappa$ can be achieved. Even for $\epsilon_m=0.5$ (which is the value achieved in a coflowing ejector with equal mass flow) a value of $\eta_{comp}$ greater than 0.8 can be obtained for values of $\kappa$ greater than 0.39. The maximum values of $\kappa$ are related to the total temperature ratio:

$$\kappa_{max} = 1/\sqrt{T_R} \qquad \text{(E-25)}$$

where $$T_R = T_{op\epsilon}/T_{os\epsilon} \qquad \text{(E-26)}$$

The maximum value of $\kappa$ is indicated for various temperature ratios $T_R$ on FIG. 3.

Following procedures similar to those used in obtaining Equation (E-24) an equation can be obtained for the kinetic energy lost, KEL over the kinetic energy in, $KE_{in}$:

$$\frac{KEL}{KE_{in}} = 2\epsilon_m(1-\epsilon_m)\frac{(1-\kappa)^2}{1+\kappa^2} \qquad \text{(E-27)}$$

It is clear from Equation (E-27) that the maximum dissipation of the inlet kinetic energy occurs when $\epsilon_m=0.5$ (equivalent to a coflowing ejector) for all values of $\kappa$:

$$\left(\frac{KEL}{KE_{in}}\right)_{max} = \frac{1}{2}\frac{(1-\kappa)^2}{1+\kappa^2} \qquad \text{(E-28)}$$

Equation (E-28) is plotted on FIG. 4, from which it is seen that the maximum loss occurs when $\kappa=0$ and is equal to 0.5. The loss, as a function of the inlet value, is reduced for higher values of $\kappa$. Again the maximum values of $\kappa$ are related to the temperature ratio $T_R$ as indicated on FIG. 4.

Figure 5:
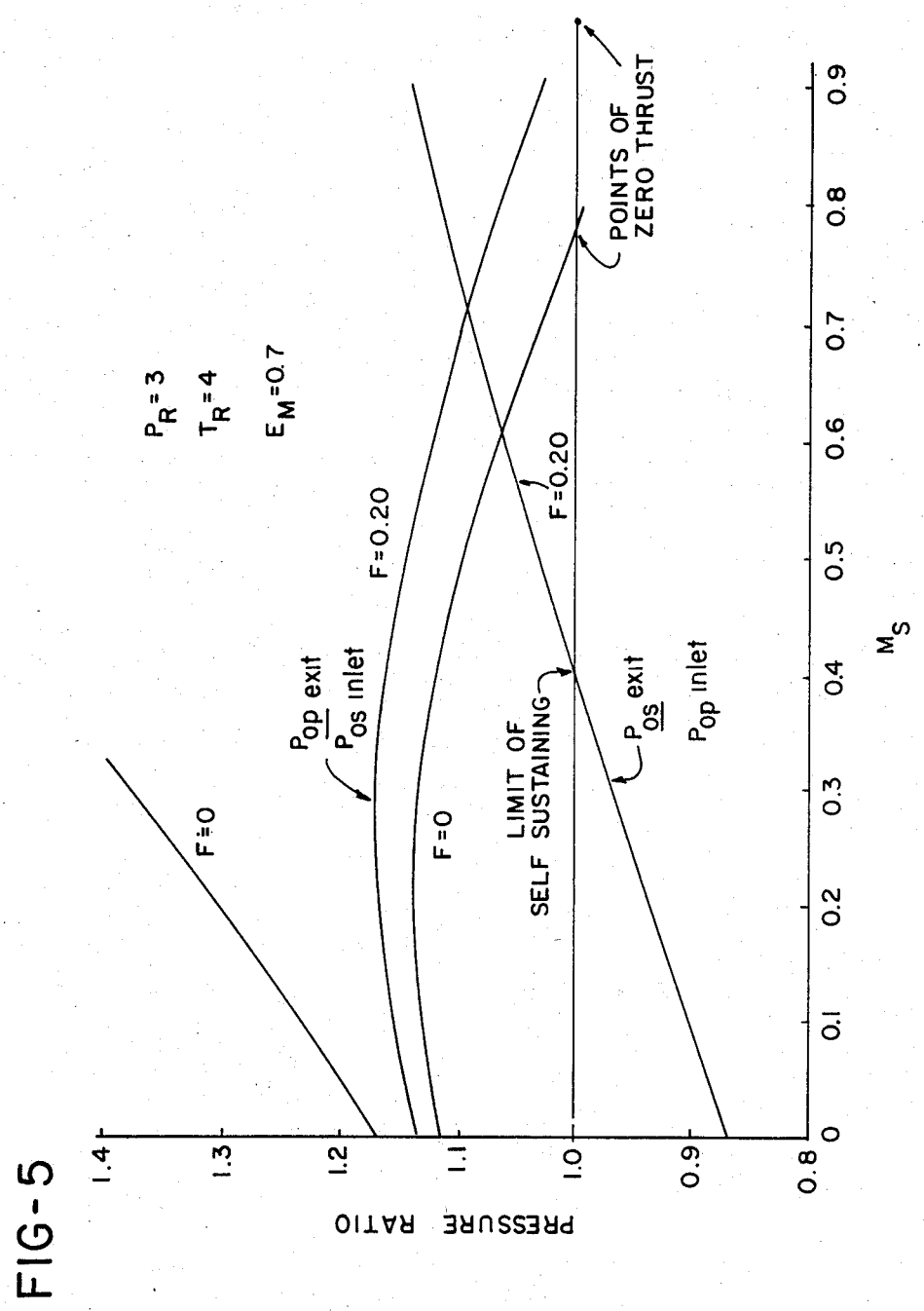
FIG. 5 is a diagram plotting pressure ratios as a function of the Mach number M of the secondary flow.

Although FIGS. 3 and 5 are only dependent on the momentum exchange, for a complete assessment of the potential of the new concepts the value of $\epsilon_H$ also must be determined. Unlike in a heat exchanger some of the energy transfer that is accounted for in Equation (E-13) is effected by the momentum transfer and does not depend on heat transfer as a result of the temperature difference between the two flows. Thus, there is a minimum value of $\epsilon_H$ which results from the momentum exchange. At the very minimum, $T_{os\lambda}-T_{os\epsilon}$ must account for the increase in kinetic energy of the secondary flow. In this case the entropy of the secondary flow would not change. In turbomachinery this would be equivalent to $\eta_c=1$ and $\eta_t=\eta_{tr}$: i.e., all of the kinetic energy loss given by Equation (E-27) would appear as an increase in the static temperature of the primary flow. Of course such a split in the losses is unlikely, rather some of the loss would appear in the secondary and some in the primary flow. For purposes of this explanation, an arbitrary split of 0.5 is assumed. Thus, the static temperature of the secondary flow is assumed to increase sufficiently to account for one-half of the kinetic energy loss. Consequently, the total temperature also increases by the same amount plus an amount which results from the kinetic energy increase. It can be shown that this results in the following equation for the minimum $\epsilon_H$:

$$\epsilon_{Hmin} = \frac{T_R}{T_R - 1}\left[\frac{\frac{\gamma-1}{2}M_{p\epsilon}^2}{1 + \frac{\gamma-1}{2}M_{p\epsilon}^2}\right]\epsilon_m(1-\kappa^2) \qquad \text{(E-29)}$$

Of course $\kappa$ and $M_{p\epsilon}$ are not independent parameters. For example, if a value of the inlet secondary Mach number, $M_{s\epsilon}$, is chosen then $M_{p\epsilon}$ can be determined from the pressure ratio $P_R$ (where $P_R = P_{op\epsilon}/P_{os\epsilon}$) since both the secondary and primary flows are assumed to be at the same static pressure within the momentum exchanger. Hence, $\kappa$ is also determined since it is related to the entrance Mach numbers by the following equation:

$$\kappa = \frac{M_{s\epsilon}}{M_{p\epsilon}}\sqrt{\frac{1 + \frac{\gamma-1}{2}M_{p\epsilon}^2}{1 - \frac{\gamma-1}{2}M_{s\epsilon}^2 T_R}} \qquad \text{(E-30)}$$

Hence, $\epsilon H_{min}$ can be thought of as a function of $P_R$, $T_R$, $\epsilon_m$ and $M_{s\epsilon}$ (or $\kappa$). An additional increase in the value of $T_{os\lambda}$ (or $T_{s\lambda}$) can result from heat transfer effects. It is convenient to define a factor F by the following equation:

$$\epsilon_H = \epsilon_{Hmin} + F(1 - \epsilon_{Hmin}) \qquad \text{(E-31)}$$

Thus, if $F=0$ then $\epsilon_H = \epsilon_{Hmin}$ and if $F=1$ then $\epsilon_H=1$. The factor, F, therefore, represents the fraction of the possible heat transfer.

The performance of the momentum exchanger is completely determined for given values of $P_R$ and $T_R$ by variations in the three parameters $\epsilon_m$, f, and $M_s$ ($\kappa$ could be used instead of $M_s$). For purposes of analysis and understanding a computer program was written which allowed for variation of the three parameters as well as $P_R$ and $T_R$. Results were obtained for the arbitrary case of $P_R=3$ and $T_R=4$ and are presented in a series of figures discussed below.

The three parameters ($\epsilon_m$, f, and $M_s$) were varied to investigate self-sustained operation of a jet engine. FIG. 5 is an example of some of the results for the exit pressure ratios vesus $M_s$. The page parameter is $\epsilon_m=0.7$ (as well as $P_R=3$ and $T_R=4$) and results are given for $F=0$ and $F=0.2$. If other losses are neglected then the limit of self-sustained operation is reached when $P_{os\lambda} = P_{op\epsilon}$, or the ratio $P_{os\lambda}/P_{op\epsilon}$ must be equal to one or greater than one. On the other hand for the engine to develop thrust at zero flight speed (where $P_{os\epsilon} = P_{amb}$ then $P_{op\lambda}$.

$/P_{os\epsilon}$ also must be greater than one. Inspection of FIG. 5 shows that a broad range of $M_s$ is available where both pressure ratios are greater than one, and in fact enough margin is available to account for losses in other components.

Figure 6:
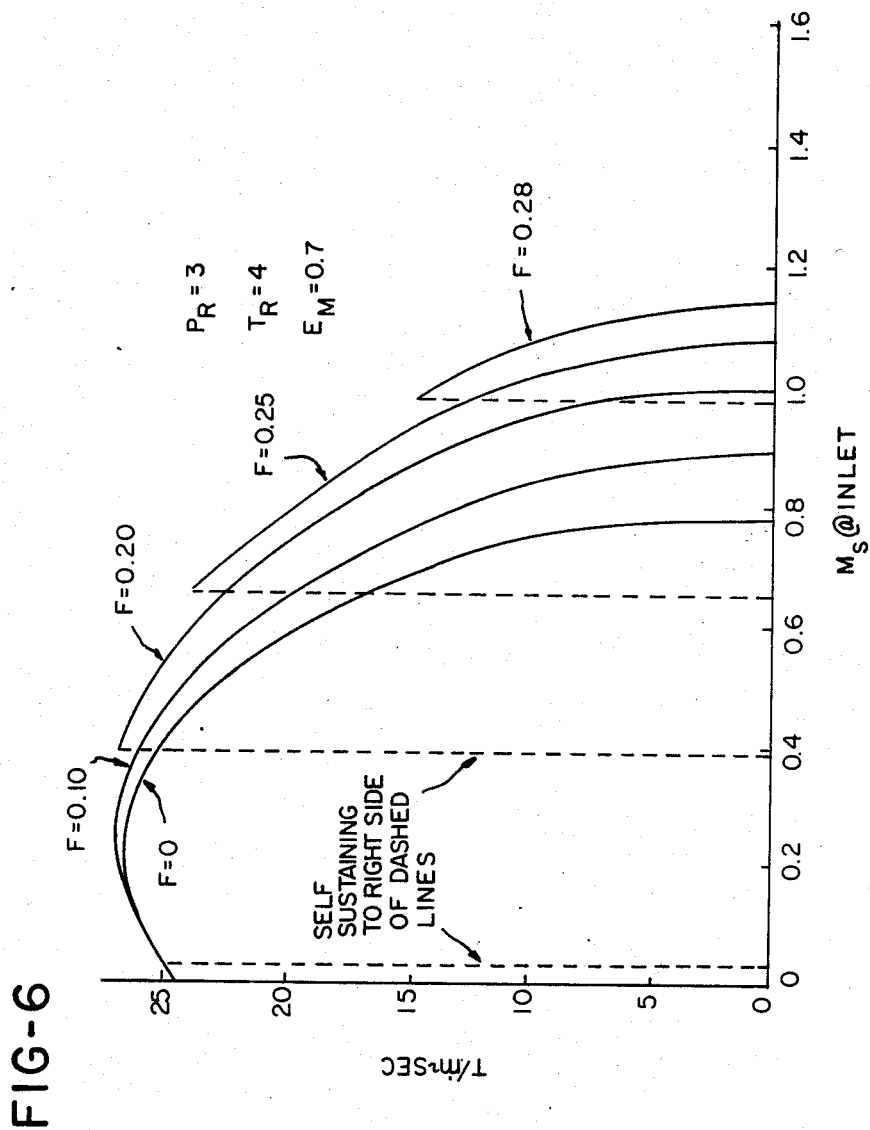
FIG. 6 is a diagram plotting specific thrust as a function of the Mach number of the secondary flow.

Using information such as that shown in FIG. 5 the specific thrust calculations are presented in FIG. 6 where the stillstanding specific thrust (T/m in seconds) is plotted as a function of $M_s$. Again the page parameter is $\epsilon_m=0.7$ and the curve parameter is F, which ranges from 0 to 0.28. The engine is self-sustaining to the right of the dashed lines shown on FIG. 6.

As an example consider the case of F=0.2. The engine is self-sustaining at a Mach number, $M_s$, of just under 0.4. From FIG. 6 we see that this is the value of $M_s$ where $P_{os\lambda}/P_{op\epsilon}=1$. The specific thrust at this point is about 26.7 seconds. As $M_s$ increases the specific thrust drops and reaches zero at a value of $M_s$ just slightly greater than one. This is the point where $P_{op\lambda}/P_{os\epsilon}$ first reaches one as can be estimated from FIG. 6.

Figure 7:
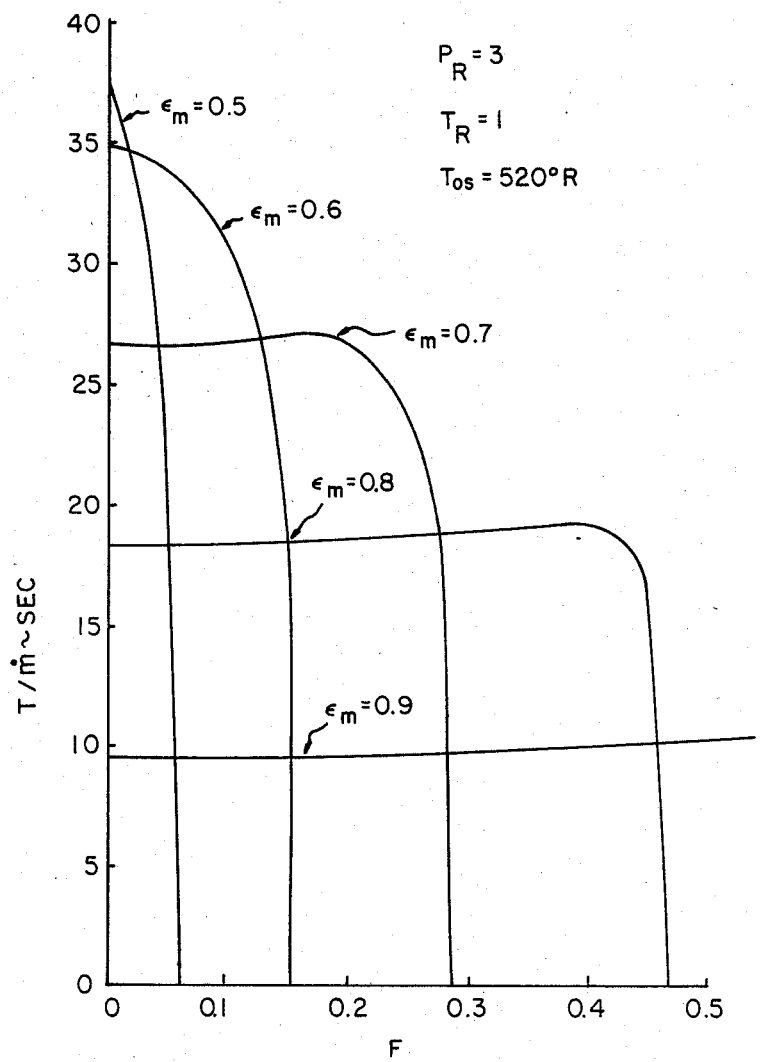
FIG. 7 is a diagram plotting specific thrust as a function of a factor F representing the fraction of heat transfer.

Using data similar to that of FIG. 6, FIG. 7 illustrates the maximum specific thrust plotted as a function of F for a given value of $\epsilon_m$. For example if $\epsilon_m=0.7$ and F=0.2, the value of specific thrust that is plotted is 26.7 seconds which is the maximum value taken from FIG. 7.

Figure 8:
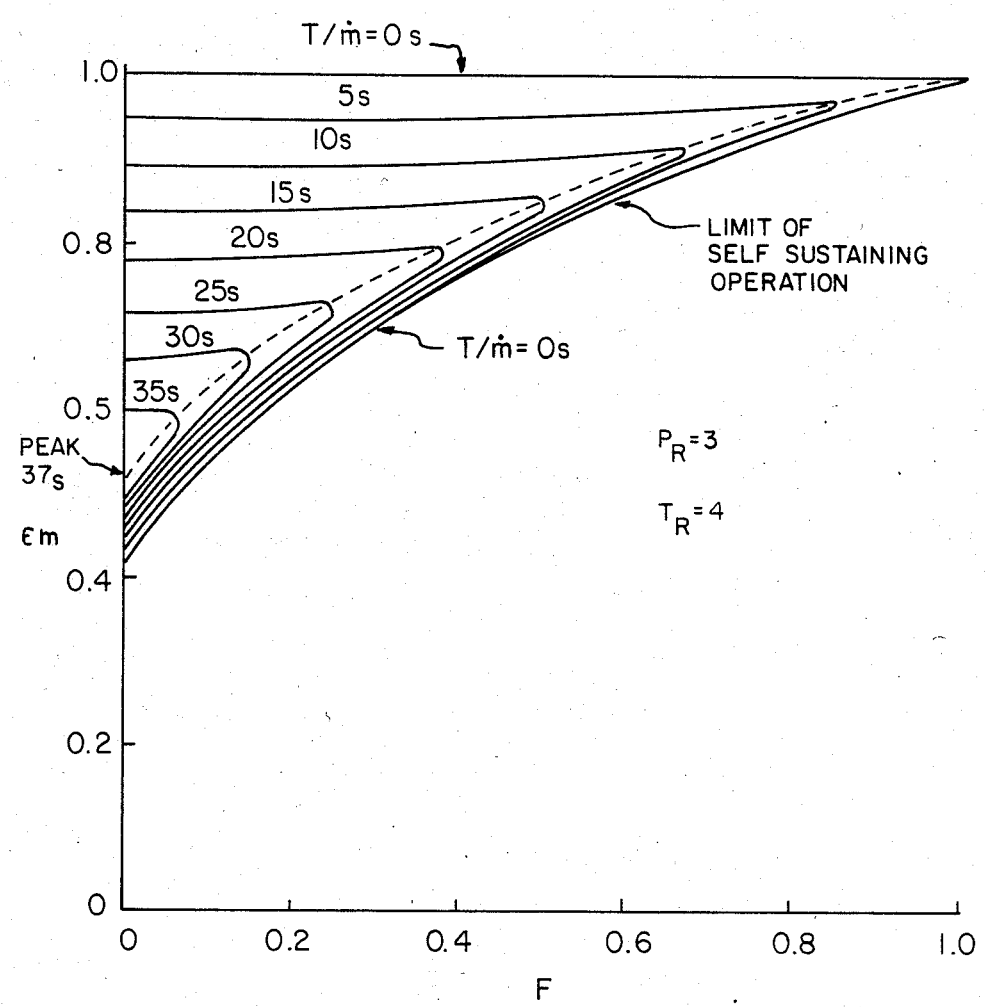
FIG. 8 is a plot of lines of constant maximum specific thrust in $E_m$-F plane.

Finally a contour plot of specific thrust is given in the $\epsilon_m$-F plane on FIG. 8. It is seen that a substantial portion of the plane is available for operation of a self-sustaining engine that develops thrust at stillstanding. It should be noted that self-sustaining operation can even occur for a value of $\epsilon_m=0.5$ if the value of F is low enough. This means that a coflowing system can be self-sustaining if, for example, large eddies are formed which would achieve speed equilibrium and which then are separated before they achieve thermal equilibrium.

It is also seen from FIG. 8 that there is a maximum specific thrust of about 37 seconds and that this occurs at F=0 and $\epsilon_m=0.52$. Thus, the most intense momentum exchange process with minimum irreversible mixing (mass and heat transfer) is that described as Case 3, which has been described as semi-unstable. This process is therefore chosen for a "No Moving Part" machine, upon which the following configurations is based.

Jet Engine Without Moving Parts

Figure 10:
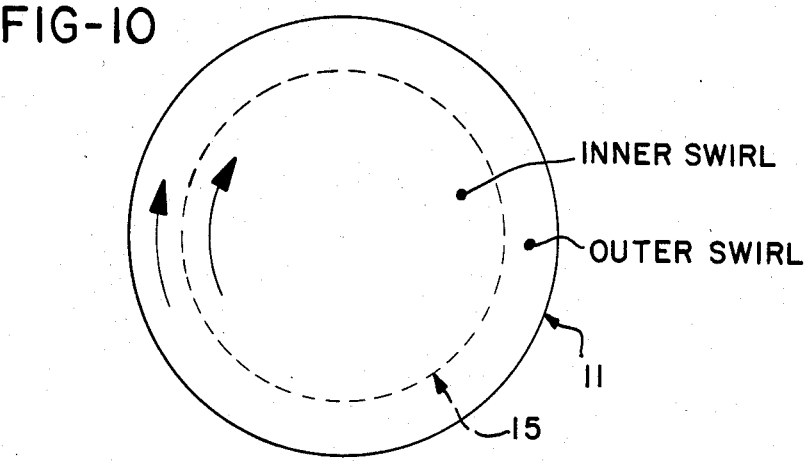
FIG. 10 and FIG. 11 are diagrammatic cross-sectional views taken on lines 10—10 and 11—11 respectively in FIG. 9.
Figure 11:
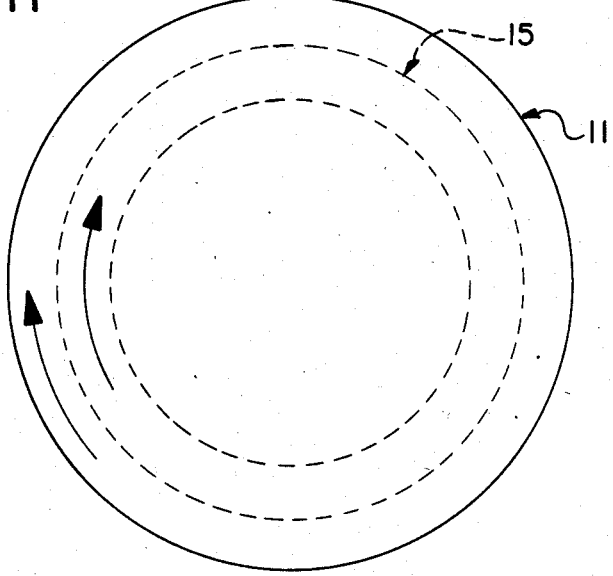

FIG. 9 shows a schematic view of a jet engine with no moving parts. Fresh air enters through the inlet duct 10 which is defined by outer housing 11 and a front central bluff body 12, and receives a strong tangential velocity component (angular momentum) by the swirl inducer vanes 14. The static pressure in the regime between plane 10—10 (FIG. 10) and plane 11—11 (FIG. 11) is subambient at any radius r smaller than R. The swirling outer cold air stream (the secondary flow) between interface 15 and housing 11 is accelerated in the tangential direction by direct contact with the inner stream of high temperature combustion gas (the primary flow) along the interface 15. As shown in FIG. 10 initially the flow at plane 10—10 is semi-unstable and violent mixing of large eddies takes place which then produces a stable Case 1 condition.

The combustor gas exits through swirl inducing exit vanes 30, and has a considerably greater tangential velocity than the cold gas because of the geometry of the swirl vanes 30. Although a stable Case 1 condition prevails near plane 11—11 the tangential velocity of the inner hot gas flow is greater than the tangential velocity of cold gas and momentum is still transferred from this inner flow to the outer swirl flow. As the inner flow intersects the back wall 32 of body 12, the gases reverse direction, although still swirling, and proceed to the exit passage defined between the combustor 25 and rear bluff body 33. Here the deswirling vanes 35 redirect the gas flow to a generally longitudinal direction through the exit nozzle 38.

The key to the functioning of the device is a strong interaction between the hot and cold flows with respect to strong angular momentum exchange, but smallest possible "irreversible mixing" and "heat-transfer." To achieve this, semi-unstable flow conditions at the interface 15 are chosen for the momentum exchange process and the cold gas flow always remains outside.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of producing a mass fluid flow from an engine housing without use of rotating parts,
   comprising the steps of:
   causing an inlet flow of air to swirl into a first circular path moving longitudinally of the housing,
   adding heat energy to said inlet flow of air at the end of said first path to produce hot gases,
   directing the hot gases into a second swirling circular path coaxially of and within the first path and having an open interface therewith whereby momentum is transferred from the hot gases in the second path into the inlet flow of air in the first path, and
   converting the swirling hot gases at the end of the second path into an essentially unidirectional gas flow exiting the housing.

2. A method of producing a mass fluid flow from an engine housing without use of rotating parts,
   comprising the steps of:
   causing an inlet flow of cold air to swirl into a first circular path moving longitudinally of the housing,
   adding heat energy to said inlet flow of air at the end of said first path to produce hot gases,
   directing the hot gases into a second swirling circular path coaxially of and counterflowing within the first path and having an open interface therewith at such velocity and temperature relative to the cold air flow that the two flows are initially Taylor unstable at the entrance of the cold gas to the interface whereby momentum is transferred from the hot gases in the second path into the inlet flow of air in the first path, and
   directing the hot gases at the end of the second path from a swirling flow path into an essentially unidirectional gas flow exiting the housing.

3. The method as defined in claim 2, wherein conditions at the interface are
   $\rho_i$ is less than $\rho_o$,
   $\rho_i U_i^2$ is greater than $\rho_o U_o^2$;
   $\rho_i$ being the density of hot gases in the first path,
   $\rho_o$ being the density of the cold air in the second flow,
   $U_i$ being the velocity of hot gases in the first path, and $U_o$ being the velocity of the cold air in the second path.

4. A method of transferring energy into a flow of air without the use of rotating parts, comprising the steps of:

causing an inlet flow of air to swirl into a first circular path moving longitudinally of the housing, adding heat energy to said inlet flow of air at the end of said first path to produce hot gases, the density of the inlet air being greater than the density of the hot gases, directing the hot gases into a second swirling circular path coaxially of and within the first path and having an open interface therewith whereby momentum is transferred from the hot gases in the second path into the inlet flow of air in the first path.

5. The method as defined in claim 4, wherein the product of the density of the inlet air and the square of the velocity of the inlet air is less than the product of the density of the hot gas and the square of the velocity of the hot gas.

6. A method of producing a mass fluid flow from a housing without use of rotating parts, comprising the steps of:

causing a flow of colder air to swirl into a first circular path moving longitudinally of the housing, adding heat energy to said flow of colder air at the end of said first path to produce hot gases, directing the hot gases into a second swirling circular path coaxially of and counterflowing within the first path and having an open interface therewith at such velocity and temperature relative to the colder air flow that the two flows are initially Taylor unstable at the entrance of the cold gas to the interface whereby momentum is transferred from the hot gases in the second path into the flow of air in the first path, and utilizing the hot gases at the end of the second path as a mass reaction media.

* * * * *